F. R. BLAIR.
FLEXIBLE COUPLING.
APPLICATION FILED APR. 22, 1918.
1,302,291.
Patented Apr. 29, 1919.
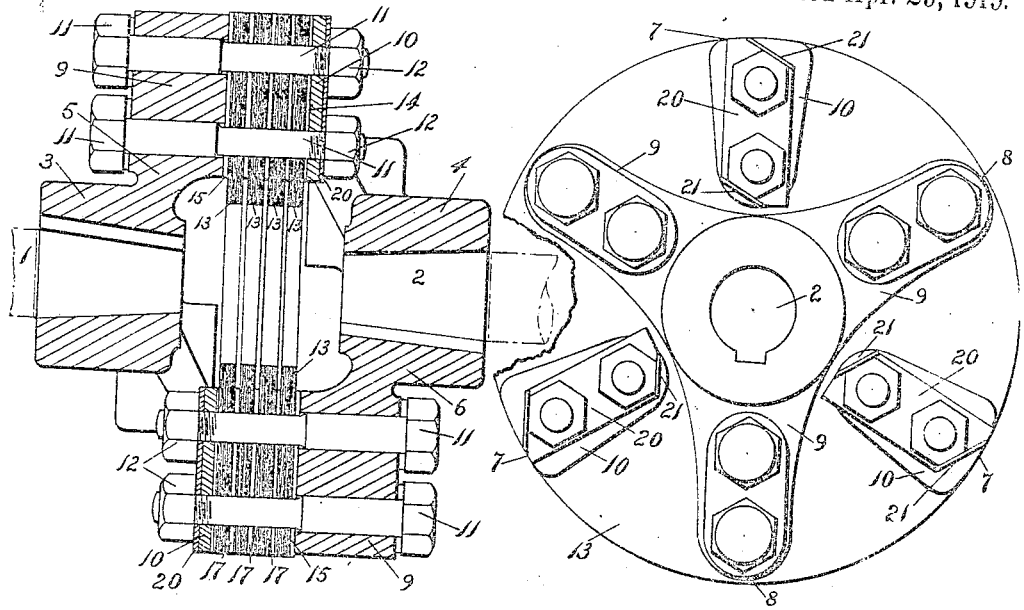
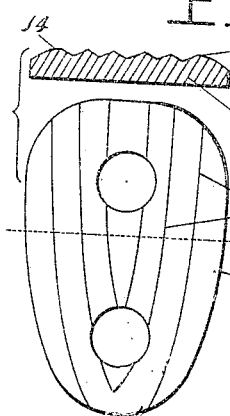
Fig. 1.  Fig. 2.
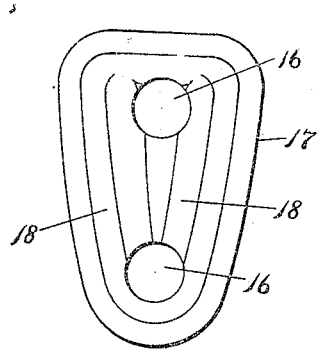
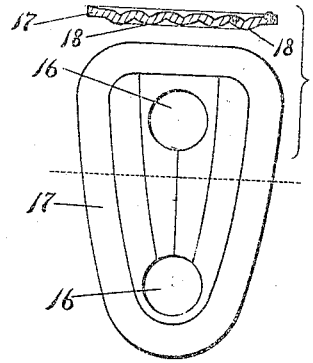
Fig. 3.  Fig. 4.  Fig. 5.
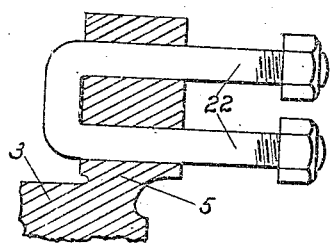
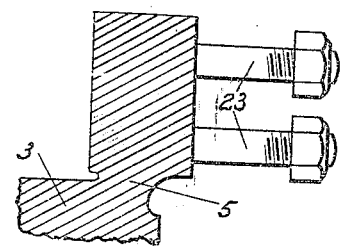
Fig. 6.  Fig. 7.
INVENTOR
F. R. Blair
BY
Duell, Warfield & Duell
ATTORNEY

UNITED STATES PATENT OFFICE.

FRANK ROSS BLAIR, OF GLEN RIDGE, NEW JERSEY, ASSIGNOR TO F. R. BLAIR & CO., INC., OF NEW YORK, N. Y., A CORPORATION OF NEW YORK.

FLEXIBLE COUPLING.

1,302,291.        Specification of Letters Patent.      Patented Apr. 29, 1919.

Application filed April 22, 1918. Serial No. 229,956.

*To all whom it may concern:*

Be it known that I, FRANK R. BLAIR, a citizen of the United States, residing at Glen Ridge, in the county of Essex and State of New Jersey, have invented certain new and useful Improvements in Flexible Couplings, of which the following is a full, clear, and exact description, such as will enable others skilled in the art to which it appertains to make and use the same.

This invention relates to power transmitting couplings, and with respect to its more specific features, to flexible couplings for the transmission of torque.
One of the objects of the invention is the provision of a practical device to efficiently transmit torque.

Another object of the invention is the provision of a simple device to transmit torque without slip between the driving and driven parts.

Another object of the invention is the provision of a practical and simple device for connecting driving and driven shafts by means of a flexible disk or disks so as to mitigate wear on the disk while in operation thereby prolonging the life of the coupling and maintaining the effective transmission of power.
Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, and wherein similar reference characters refer to similar parts throughout the several views,—

Figure 1 is a central longitudinal section of a coupling embodying the invention.
Fig. 2 is an end view of Fig. 1.

Figs. 3, 4 and 5 are views of certain plates or jaws employed in the present embodiment.

Figs. 6 and 7 are views illustrating certain modifications of the coupling.

In the drawing the numerals 1 and 2 indicate rotatable driving and driven shafts connected by a flexible joint which is designed to transmit torque from the driving to the driven shaft and to permit displacement of the axis of the two shafts angularly relative to each other while in operation. The device finds a special utility, in the transmission mechanism of automobiles. The numerals 3 and 4 indicate hubs fixed to rotate with shafts 1 and 2, and arms 5 and 6 extending from these hubs provide elements to which the intermediate flexible disk is clamped. In the present embodiment each hub has three of said arms so as to provide two spiders, and the arms of one shaft are connected to the disk at points 7, 7, 7, alternating with those 8, 8, 8, at which the arms of the other shaft are connected thereto, and at some distance radially from the axis of rotation. In the present embodiment the clamping devices for all the arms are similar and a description of one will suffice for all.

On the outside of the flexible disk two main clamping jaws 9 and 10 are disposed. In the present embodiment one of these main jaws is conveniently provided by proper fashioning of the outer end of the arms 5 and 6, as for instance, the jaw 9. The cooperative main clamping jaw 10 comprises a metallic plate disposed at the outside of the flexible disk opposite the jaw 9, the clamping being effected, in the present embodiment, by the instrumentality of one or more tension members, or bolts, 11 and nuts 12, the bolts extending through openings in the jaws 9 and 10 and the flexible disk. Two tension members or bolts for each pair of clamping jaws are illustrated, but it will be understood that the invention, viewed in certain aspects, permits the employment of one bolt.

The clamping faces of the main jaws 9 and 10 are of such dimensions as to clamp therebetween a substantial portion radially, of the disk, so as to distribute the load over a large portion of the width of the disk. When an annular disk is employed, as illustrated, the greater portion of the width of the annulus may be thus clamped between each pair of main jaws to take the load.

Each of the jaws 9 and 10 is capable of taking the normal clamping strain without substantial deflection. As illustrated, the jaw 9 is the thickened outer end of the spider arm, the jaw 10 being a relatively thick metallic plate, as a drop forging, each jaw being thus sufficiently rigid to withstand the clamping strain without deflection.

In the present embodiment the flexible disk is of textile material, being made of linen sheets superposed and pressed together and otherwise treated to form a generally fibrous strong plate, or disk, capable of taking the torque. One or more disks may be utilized, depending on the load to be taken and the flexibility required. Four disks or plates 13, are utilized in the present embodiment, and it is to be understood that the term "disk" employed herein may include one or several as the context may require. To effect the firm and secure clamping of the disk to the arms of the spider, so as to avoid slipping under the torque, and to avoid wear and consequent looseness of parts, there is provided a positive clutching effect between the disk and the clamping jaws 9 and 10. In the present embodiment the disk clamping face of the jaw 10 is provided with clutch teeth 14, forged with this jaw and it is found in practice that efficient results are secured by having these teeth of an elongated character, with their length lying transversely to the line of torque strain, and in lines generally radial to the disk. They may be slightly curved, as illustrated in Fig. 3. The clamping face of the jaw 9 is also provided with clutch teeth, but on account of the exigencies of manufacture and assembly of parts it is preferred to provide such teeth of this jaw by means of a metallic toothed plate 15 adapted to lie closely against the end of the jaw 9, and held in place by the bolts 11 which nicely fit openings 16 in said plate. The toothed plate 15 is of hard metallic material, and is preferably rigid although rigidity to the extent required in the jaw 10 need not be attained, as the rigid jaw 9 will reinforce this plate and therewith provide a rigid toothed jaw. For convenience in manufacture and assembly, however, and for reasons of practical efficiency, as will appear, the plate 15 is preferably constructed to be similar to certain spacing plates 17, employed in the present embodiment. These spacing members, or distance plates, are interposed between the disks 13 to slightly space the disks for ready flexing. The plates 17 are sufficiently rigid to withstand the clamping and other strains without substantial flexing, and may be thinner than the jaw 10. The plates 17 also operate as clamping jaws, as will be apparent, and are provided on opposite faces with clutch teeth to engage the surfaces of the adjacent flexible disk 13.

In this wise the connection between the flexible disk and the element or arm 5 or 6, as the case may be, for transmission of torque is very effective, the torque strain, as it were entering the disk through its surface, the gripping effect of the construction being such that the wear, otherwise consequent upon the transmission of the torque through the walls of the bolt openings in the disk, is eliminated. To guard against such wear, due to possible insecurity of fastening, the bolt openings in the disks may be of greater diameter than the bolts. The bolts nicely fit the openings therefor in the jaws 9 and 10, so that the torque strain may be transmitted to and from the shafts 1 and 2, through the clamping jaws and without slip between the bolts and jaws.

To augment the clamping effect of the jaws, the teeth of adjacent clamping jaws, whether they be those of the jaws 9 and 10; of two adjacent plates or jaws 17, or of a jaw 9 or 10 and a plate 17, are arranged so that the ends of the teeth of one jaw lie opposite the space between the ends of the teeth of an adjacent jaw; for instance, the ends 18 of the teeth of the plate 15 lie opposite the depression between the ends of the teeth 14 of plate 10 when no spacing plates are employed, and the ends of the teeth of one spacing plate 15 similarly lie opposite the spaces between the teeth of an adjacent spacing plate. By this complemental arrangement, notwithstanding the use of clutch teeth the flexible disk will be effectively gripped over the surface clamped between the jaws, and the strain thus distributed over a substantial width of the disk. By making the clamping jaws rigid, as explained, the clamping pressure is spread over the full area of the clamping faces of these jaws, so as to be generally uniform.

In the present embodiment the means to effect the clamping of the disk between the jaws comprises a plurality of bolts 11, for each pair of main clamping jaws, a pair being shown, one bolt spaced from the other transversely of the line of torque strain. In this wise the jaw 10 is reinforced by the positive pressure of the nuts 12 at different points so as to assure uniform clamping pressure. The numeral 20 indicates a pliable washer through which the bolts 11 pass with a nice fit, this washer having portions 21 extending outside the periphery of the nuts, and adapted to be bent up against the sides of the nuts to lock them against rotation, as illustrated. It will be observed that the washer is prevented from rotation because of its engagement with two bolts.

It is to be understood that the above is merely one construction in which the invention in its several phases may be embodied. The employment of a plurality of tension members or bolts is especially efficacious when combined with the complementally toothed clamping jaws. Such bolts might be provided by U-members 22 passing through the arms 5 and 6, as illustrated in Fig. 6, or by studs 23 forming an integral part of such arms, as shown in Fig. 7.

Thus by the above described construction are accomplished, among others, the objects hereinbefore referred to.

The invention accordingly consists in the features of construction, combinations of elements, and arrangement of parts which will be exemplified in the construction hereinafter set forth, and the scope of the application of which will be indicated in the following claims.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is—

1. In a torque-transmitting flexible coupling, in combination, a flexible disk, means adapted to connect said disk to another element for transmission of torque comprising clamping jaws between which the disk is interposed, and means adapted to effect clamping of the disk between the jaws, each of said jaws including a rigid member having teeth the lengths of which lie transversely of the line of torque strain adapted to positively clutch said disk.

2. In a torque-transmitting flexible coupling, in combination, a flexible disk, means adapted to connect said disk to another element for transmission of torque comprising clamping jaws between which the disk is interposed, and means adapted to effect clamping of the disk between the jaws, each of said jaws including a rigid member adapted to positively clutch said disk, the clutch teeth of one member being complemental to those of the next adjacent member.

3. In a torque-transmitting flexible coupling, in combination, a flexible disk, means adapted to connect said disk to another element for transmission of torque comprising clamping jaws between which the disk is interposed, and means adapted to effect clamping of the disk between the jaws, each of said jaws including a rigid member having teeth the lengths of which lie transversely of the line of torque strain adapted to positively clutch said disk, the clutch teeth of one member being complemental to those of the next adjacent member.

4. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, said latter jaw comprising a rigid member having teeth to clutch said disk, and a bolt opening closely fitting the bolt.

5. In a torque-transmitting flexible coupling, in combination, a flexible disk, clamping jaws between which said disk is disposed, and means adapted to effect clamping of the disk between the jaws comprising a plurality of bolts extending through said disk and one of said jaws, one of said bolts being spaced from another transversely of the line of torque strain, said last mentioned jaw comprising a rigid member adapted to positively clutch said disk, one of said jaws having clutch teeth complemental to clutch teeth on a coöperative jaw.

6. In a torque-transmitting flexible coupling, in combination, a flexible disk, clamping jaws between which said disk is disposed, and means adapted to effect clamping of the disk between the jaws comprising a plurality of bolts extending through said disk and one of said jaws, one of said bolts being spaced from another transversely of the line of torque strain, said last mentioned jaw comprising a rigid member adapted to positively clutch said disk, one of said jaws having clutch teeth complemental to clutch teeth on a coöperative jaw, the length of said teeth being transverse to the line of torque strain.

7. In a torque-transmitting flexible coupling, in combination, a flexible disk, clamping jaws between which said disk is disposed, and means adapted to effect clamping of the disk between the jaws comprising a plurality of bolts extending through said disk and one of said jaws, one of said bolts being spaced from another transversely of the line of torque strain, said last mentioned jaw comprising a rigid member adapted to positively clutch said disk, one of said jaws having clutch teeth complemental to clutch teeth on a coöperative jaw, and said jaws overlying a large part of the width of said disk.

8. In a torque-transmitting flexible coupling, in combination, a plurality of flexible disks side by side, a toothed spacing member between adjacent disks, clamping jaws between which said disks and spacing member are disposed, and means adapted to effect clamping comprising a tension member passing through said disks and spacing member, one of said jaws being rigid and having teeth to clutch the adjacent disk.

9. In a torque-transmitting flexible coupling, in combination, a plurality of flexible disks side by side, a toothed spacing member between adjacent disks, clamping jaws between which said disks and spacing member are disposed, and means adapted to effect clamping comprising a plurality of bolts passing through said disks and spacing member and one of said jaws, one of said bolts being spaced from another transversely of the line of torque, and said last mentioned jaw being rigid, and having teeth to clutch the adjacent disk, and the bolt openings therein closely fitting said bolts.

10. In a torque-transmitting flexible coupling, in combination, an annular flexible disk, clamping jaws between which said disk is disposed, said jaws comprising teeth adapted to clutch the disk, the teeth of one jaw being complemental to those of a next adjacent jaw, one of said jaws being rigid and having a pair of bolt openings therein at different points transversely of the line of torque strain, and bolts passing through said disk and bolt openings and closely fitting the latter openings.

11. In a torque-transmitting flexible coupling, in combination, an annular flexible disk, calmping jaws between which said disk is disposed, said jaws comprising teeth adapted to clutch the disk, the teeth of one jaw being complemental to those of a next adjacent jaw, one of said jaws being rigid and having a pair of bolt openings therein at different points transversely of the line of torque strain, and bolts passing through said disk and bolt openings and closely fitting the latter openings, nuts on said bolts, and a pliable washer having openings through which said bolts pass and portions extending outside the periphery of said nuts adapted to be bent to coöperate with said nuts to restrain rotation thereof.

In testimnoy whereof I affix my signature, in the presence of two witnesses.

FRANK ROSS BLAIR.

Witnesses:
FLORENCE E. SLOAT,
MARGARET C. COLLINS.